United States Patent [19]

Lowery et al.

[11] 4,229,268

[45] Oct. 21, 1980

[54] ACID ZINC PLATING BATHS AND METHODS FOR ELECTRODEPOSITING BRIGHT ZINC DEPOSITS

[75] Inventors: Richard K. Lowery, Garfield Heights; Thomas W. Starinshak, Berea, both of Ohio

[73] Assignee: Rohco, Inc., Cleveland, Ohio

[21] Appl. No.: 55,803

[22] Filed: Jul. 9, 1979

Related U.S. Application Data

[63] Continuation-in-part of Ser. No. 972,739, Dec. 26, 1978, abandoned.

[51] Int. Cl.³ .............................................. C25D 3/22
[52] U.S. Cl. ................................................. 204/55 R
[58] Field of Search ............ 204/55 R, 43 Z, DIG. 2

[56] References Cited

U.S. PATENT DOCUMENTS

| | | | |
|---|---|---|---|
| 3,787,296 | 1/1974 | Hayashida et al. | 204/55 R |
| 4,162,947 | 7/1979 | Canaris | 204/55 R |
| 4,169,772 | 10/1979 | Lowery et al. | 204/55 R |

FOREIGN PATENT DOCUMENTS

| | | | |
|---|---|---|---|
| 47-22339 | 7/1972 | Japan | 204/55 R |
| 50-10536 | 4/1975 | Japan | 204/55 R |

*Primary Examiner*—G. L. Kaplan
*Attorney, Agent, or Firm*—Maky, Renner, Otto & Boisselle

[57] ABSTRACT

An aqueous acidic plating bath for the electrodeposition of a bright zinc deposit on a substrate is disclosed and comprises zinc ions, and an amount sufficient to provide a level and bright zinc electrodeposit, of a polymeric sulfur-containing compound having the general formula $$RS(R'O)_{\overline{n}}H, \text{ or} \qquad (I)$$

$$(S[(R')_{\overline{n}}H]_2 \qquad (II)$$

wherein R is an alkyl group containing up to about 24 carbon atoms, each R' is independently an alkylene group containing 2 or 3 carbon atoms and each n is independently an integer of from 1 to about 100.

Additionally, the plating baths of the invention may contain at least one aromatic carbonyl-containing compound and particularly aromatic aldehydes and aromatic carboxylic acids. Aromatic sulfonic acids and ethylene oxide condensates of such sulfonic acids also are useful in the plating baths of the invention. Other ethylene oxide condensates can be included in the baths including those derived from carboxylic acids, amides, amines, alcohols, phenols and naphthols. Methods for depositing bright zinc coating over a wide range of current densities, and additive compositions for preparing plating baths useful in these methods also are described.

16 Claims, No Drawings

4,229,268

ACID ZINC PLATING BATHS AND METHODS FOR ELECTRODEPOSITING BRIGHT ZINC DEPOSITS

CROSS-REFERENCE TO RELATED APPLICATION

This application is a continuation-in-part of copending application Ser. No. 972,739, filed Dec. 26, 1978, now abandoned.

BACKGROUND OF THE INVENTION

The invention relates to the electrodeposition of zinc, and particularly to a plating bath for plating bright level zinc deposits from aqueous acid plating baths. More particularly, the invention relates to the incorporation into the acid zinc baths of at least one polymeric sulfur-containing compound. The invention also relates to methods for electro-depositing level and bright zinc deposits from such baths.

Considerable attention has been directed over the years to the development of zinc electroplating baths which will produce bright and level deposits of improved quality. Much research has been devoted to improving the overall brightness, the range of allowable current densities, and ductility of the zinc deposits. Until recently, most of the successful zinc plating baths were aqueous alkaline zinc plating baths containing substantial quantities of cyanide which has caused concern regarding toxicity and waste disposal problems.

Accordingly, activity in the plating area has been devoted either to the development of a cyanide-free alkaline plating bath or improvements in acid plating baths. This invention relates to acid plating baths.

Typically, acid plating baths have been based on a suitable inorganic zinc salt such as zinc sulfate or zinc chloride, and the baths usually include buffers such as ammonium sulfate or ammonium chloride, and other additives to promote and improve ductility, brightness, throwing power and covering power. Surface active agents may be included to improve crystal structure, reduce pitting and increase the solubility of other additives.

Aromatic carbonyl-containing compounds generally are incorporated into acid zinc baths as a supplemental brightener additive and for improving fineness of the grain of the zinc deposit. Wetting agents or surfactants have been added to these baths to solubilize or improve the solubility of the carbonyl-containing compounds in the baths, but such wetting agents and surfactants generally result in a bath exhibiting a tendency to foam excessively, particularly on agitation and at the higher current densities often used in zinc plating.

SUMMARY OF THE INVENTION

The present invention relates to the discovery that a bright and level zinc electrodeposit can be obtained from aqueous acid plating baths containing zinc ions and an amount, sufficient to provide a level and bright deposit, at least one polymeric sulfur-containing composition having the general formula $$RS(R'O)_{\overline{n}}H, \text{ or} \quad (I)$$

$$S[(R'O)_{\overline{n}}H]_2 \quad (II)$$

wherein R is an alkyl group containing up to about 24 carbon atoms, each R' is independently an alkylene group containing 2 or 3 carbon atoms and each n is independently an integer of from 1 to about 100.

The acid zinc plating baths of the invention also may contain aromatic carbonyl compounds such as aromatic aldehydes, aromatic ketones, aromatic carboxylic acids and bath-soluble salts of aromatic carboxylic acids, as well as aromatic sulfonic acids and ethylene oxide condensate surfactants. The plating baths of the invention are effective over a wide current density range.

DESCRIPTION OF THE PREFERRED EMBODIMENTS

The compositions which have been found to be useful particularly in acid zinc plating baths for improving the properties of the plating bath in providing an acid plating bath which is effective over a wide current density range are polymeric sulfur-containing compositions having the general formula $$RS(R'O)_{\overline{n}}H, \text{ or} \quad (I)$$

$$S[(R'O)_{\overline{n}}H]_2 \quad (II)$$

wherein R is an alkyl group containing up to about 24 carbon atoms, each R' is independently an alkylene group containing 2 or 3 carbon atoms, and each n is independently an integer up to about 100. The compositions according to Formula (I) can be prepared by reacting a mercaptan with an excess of ethylene or propylene oxide or mixtures of such oxides. An alkaline catalyst generally is used in promoting the condensation reaction. Examples of alkaline catalysts include alkali metal hydroxides, oxides and alcoholates. The preparation of compounds represented by formula I is described in more detail in U.S. Pat. No. 2,494,610 which disclosure is hereby incorporated by reference.

Compounds of the type represented by Formula (II) can be prepared by reacting one mole hydrogen sulfide, 2-hydroxyethyl sulfide or 3-hydroxypropyl sulfide with from one to 100 moles of ethylene or propylene oxide or mixtures of such oxides. Preferably, an excess of the oxide and an alkaline catalyst can be employed.

In one preferred embodiment, the sulfur-containing composition is derived from one mole hydrogen sulfide or 2-hydroxyethyl sulfide and up to 100 moles of ethylene oxide. In another embodiment, the hydrogen sulfide is replaced by a mercaptan containing 6 to 24 carbon atoms.

Polymeric sulfur-containing compositions of the type useful in the plating baths of this invention are available from, for example, Crucible Chemical Company, Greenville, S.C. These compounds are available containing various ratios of ethylene and/or propylene oxide to hydrogen sulfide, 2-hydroxymethyl sulfide or mercaptan. One such compound is available under their general trade designation CRU-PEG HS-1000 which is believed to be the reaction product of one mole of hydrogen sulfide or 2-hydroxyethyl sulfide with 23 or 21 moles of ethylene oxide and having a molecular weight of about 1040. Another example is the product identified as CRU-PEG HS-2000 which is believed to be the reaction product of one mole of hydrogen sulfide or 2-hydroxyethyl sulfide with 46 or 44 moles of ethylene oxide.

The amount of polymeric sulfur-containing compositions incorporated into the aqueous acidic zinc plating baths of the invention is an amount which will be sufficient to improve the performance of the plating bath and particularly improve the brightness over a wide current density range. The plating baths of the invention generally will contain from about one to about 20 grams of the sulfur-containing compositions per liter of bath.

The aqueous acidic zinc plating baths to which the polymeric sulfur-containing compositions of the invention may be added include the conventional zinc and ammonium containing plating baths known to those skilled in the art. Such baths contain free zinc ions and are prepared with zinc sulfate, zinc chloride, zinc fluoborate and/or zinc sulphamate. The zinc ion concentration in the plating baths may range from about 7.5 to about 75 g/l. The zinc plating baths also may contain an ammonium compound such as ammonium chloride, ammonium fluoride and ammonium sulfate. Other conducting salts and boric acid can be used. Examples of conductive salts utilized in the acid zinc plating baths of the invention include sodium chloride and sodium fluoride. Boric acid which normally is included in the zinc plating baths of the invention serves as a weak buffer to control the pH and the cathode film. The boric acid also is helpful in smoothing the deposit and is believed to have a cooperative effect with the leveling agents of the invention. The concentration of boric acid in the bath is not critical and generally will be in the range of up to about 60 grams per liter. The inorganic salts of zinc may be present in the plating baths of the invention in amounts ranging from about 10 to about 150 grams per liter. The conductive salts such as the ammonium, sodium or potassium fluoride are present in amounts ranging from about 50 to about 300 grams per liter or more.

The acidity of the acid baths of the invention may vary from a pH of from about 1.5 to about 6 to 7. The pH may be lowered if desired by the addition of acid solutions such as a 10% sulfuric acid solution. If the pH falls below the desired operating range, it can be increased by the addition of ammonium hydroxide or potassium hydroxide. Preferably the acid zinc baths are operated at a pH of from about 3 or 4 to about 6.5.

The acid zinc electroplating baths containing the aromatic sulfonic acid or salt compounds of the invention may be utilized to produce bright zinc deposits on all types of metals and alloys, for example, on iron, zinc die cast, copper an l brass. The electroplating baths may be employed in all types of industrial zinc plating processes including still plating baths, high-speed plating baths for strip or wire plating, and in barrel plating.

The brightness of the zinc deposited from the aqueous acid plating baths containing the polymeric sulfur-containing compositions of the invention may be improved if the bath also contains at least one aromatic carbonyl containing compound such as aromatic aldehydes, ketones, carboxylic acids and salts of carboxylic acids. The supplementary brighteners impart optimum leveling action over a wide plating range. The following compounds illustrate the types of aromatic carbonyl containing compounds which are useful as brighteners in the plating baths of the invention, and these carbonyl compounds include aldehydes as well as ketones: ortho-chlorobenzaldehyde, para-chlorobenzaldehyde, o-hydroxybenzaldehyde, aminobenzaldehyde, veratraldehyde, benzylidene acetone, coumarin, 3,4,5,6-tetrahydrobenzaldehyde, acetophenone, propiophenone, furfurylidene acetone, 3-methoxybenzal acetone, benzaldehyde, vanillin, hydroxybenzaldehyde, anisicaldehyde, benzoic acid, sodium benzoate, sodium salicylate, 3-pyridine carboxylic acid (nicotinic acid), etc. Mixtures of one or more of the acids with one or more ketones also are useful. When employed in the baths of the invention, the carbonyl-containing brighteners will be included within the range of from about 0.02 to about 3 gram per liter.

Aromatic sulfonic acids or salts also are useful additives to the plating baths and these include the acids and salts having the general formula

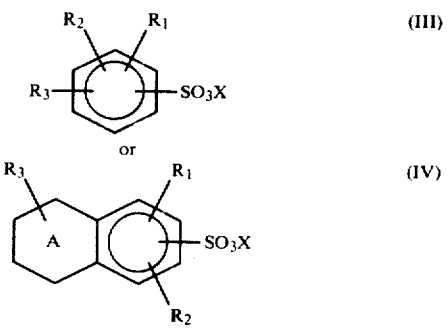

wherein
$R_1$, $R_2$ and $R_3$ are each independently hydrogen or lower alkyl groups,
X is hydrogen, ammonia or any metal with the proviso that the metal sulfonate is soluble in the bath, and
A is a saturated, unsaturated or aromatic ring.

As can be seen from the formulas, the sulfonic acids may be derived from benzene sulfonic acids, naphthalene sulfonic acids and di- or tetrahydronaphthalene sulfonic acids. The lower alkyl groups may be straight or branched chain and may contain up to about 6 carbon atoms. The aromatic sulfonic acids and salts of formulas III and IV containing two alkyl groups have been found to be particularly effective in the acid zinc plating baths of the invention. Of the metals included in the salts of the sulfonic acids, the alkali metals, particularly sodium, are preferred.

Examples of aromatic sulfonic acids which are useful in the acid zinc plating baths of the invention include benzene sulfonic acid, toluene sulfonic acid, isopropylbenzene sulfonic acid, xylene sulfonic acid, diethylbenzene sulfonic acid, naphthalene sulfonic acid, methylnaphthalene sulfonic acid, dimethylnaphthalene sulfonic acid, tetrahydronaphthalene sulfonic acid, etc. The aromatic sulfonic acids preferably are added to the acid zinc plating baths in the form of their salts which may be metal salts or an ammonium salt. Any metal can be used to form the metal salts of the aromatic sulfonic acids so long as the metal does not cause any detrimental effects in the plating bath or render the sulfonates insoluble in the plating bath.

The aromatic sulfonic acids and salts which are utilized in the aqueous acid zinc plating baths of the invention generally are referred to in the art as hydrotropes. Hydrotropes have been defined as compounds which solubilize sparingly water-soluble compounds. The aromatic sulfonic acids and salts used in the present invention are effective in solubilizing sparingly water soluble materials such as aromatic carbonyl-containing compounds, and it has been found that the acid zinc plating baths containing the above described aromatic sulfonic acids and salts are not subject to excessive foaming during plating operations. This is in contrast to plating baths wherein wetting agents and surfactants are used to stabilize the baths since such plating baths generally are characterized by excess foaming on use which requires careful control of plating methods. The acid zinc plating baths of the invention, however, can be vigorously air agitated even at high current densities without excessive foaming.

The amount of aromatic sulfonic acid or salt incorporated into the acid zinc plating baths of the invention may vary over a wide range, and the optimum amount for any particular acid zinc plating bath combination can be determined readily by one skilled in the art. Generally, the amount of sulfonic acid or salt included in the plating baths of the invention will vary from about one to about 20 or more grams per liter of bath. Greater or lesser amounts of the sulfonic acid or salts can be included in the plating baths depending particularly on the water solubility characteristics of the additive desired to be included in the bath.

Mixtures of the aromatic sulfonic acids or salts appear to be particularly effective in the acid zinc plating baths of the invention. More particularly, mixtures comprising at least one sulfonic acid or salt represented by formula III and at least one sulfonic acid or salt represented by formula IV are useful. An example of such a mixture is a mixture of sodium dimethylnaphthalene monosulfonate and sodium xylene monosulfonate.

The inclusion of the aromatic sulfonic acids and salts described above in acid zinc plating baths generally improves the performance of most acid zinc plating baths at a high current density range. Accordingly, the plating baths containing the sulfonic acids and salts are found to produce bright level zinc plating over a current density range of from below 0.3 amps/dm$^2$ to above 12 amps/dm$^2$.

The properties of the zinc deposited from the aqueous acidic baths of the invention may be enhanced further by including in the bath, a small amount of one or more polyoxyalkylated naphthols which are obtained by reacting a naphthol with an alkylene oxide such as ethylene oxide and propylene oxide, and more particularly, with from about 6 to about 40 moles of ethylene oxide per mole of naphthol. The naphthol reactant may be either alpha or beta naphthol and the naphthalene ring may contain various substituents such as alkyl groups or alkoxy groups, especially lower alkyl and lower alkoxy groups of up to about 7 carbon atoms each, so long as the polyoxyalkylated naphthol remains bath-soluble. When present, there usually will not be more than two such substituents per polyoxyalkylated naphthol; that is, two lower alkoxy groups, two lower alkyl groups, or a lower alkyl or a lower alkoxy group. The preferred polyoxyalkylated naphthols are ethoxylated naphthols having the formula

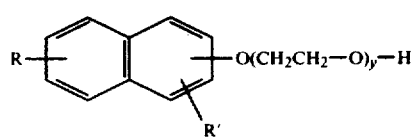

(V)

wherein y is from about 6 to about 40 and preferably from about 8 to about 20 and R and R' are each independently hydrogen alkoxy or alkyl groups containing up to 7 carbon atoms. The amount of polyoxyalkylated naphthol included in the baths of the invention may vary within the range of from about 0.1 to about 20 grams or more per liter of bath.

Another ingredient in a preferred embodiment of the acid zinc plating baths of the invention is at least one anionic aromatic sulfonic acid or salt thereof. The anionic aromatic sulfonic acids may be compounds obtained by the polycondensation of formaldehyde and an aromatic sulfonic acid which generally is a naphthalene sulfonic acid. Condensation products of this type which are useful in the plating baths of the invention have the formula

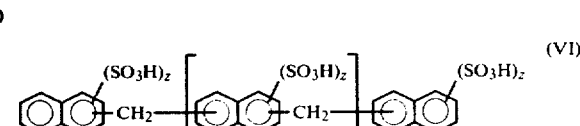

(VI)

and/or

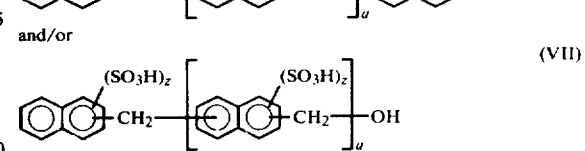

(VII)

wherein z is an integer from 1 to 3 and a is an integer from 1 to 14, preferably from 2 to 6. Polycondensation products of this type are known compounds and their production is described in, for example, Houben-Weyl, "Methoden Der Organishen Chemie," Volume XIV/2 at page 316, and said description is hereby incorporated by reference. The utility of these condensation products in ammonium-containing acid zinc baths is described in U.S. Pat. No. 3,878,069 and in ammonia-free zinc baths in U.S. Pat. No. 4,075,066. Compounds of this type are available commercially from the GAF Corporation.

The general method of preparing these polycondensation products involves reaction of a formaldehyde solution with naphthalene sulfonic acid at a temperature of from about 60° to about 100° C. until the formaldehyde odor has disappeared. Similar products can be obtained by sulfonation of naphthalene formaldehyde resins. The condensation products obtained in this manner contain two or more naphthalene sulfonic acids linked by methylene bridges which can have from one to three sulfonic acid groups.

Some examples of aromatic sulfonic acids which may be used include: a bath-soluble salt of tetrahydronaphthalene sulfonic acid such as those available commercially from DuPont; a bath-soluble salt of a xylene sulfonic acid such as those available from Arco Chemical Company under the general trade designation "Ultrawet"; and a bath-soluble salt of cumyl sulfonic acid.

These anionic aromatic sulfonic acid compounds may be introduced into the plating baths either in their acid form or as the water-soluble salts which may be the sodium or potassium salts. The amount of the anionic polycondensation product included in the acid plating baths may be varied depending upon the other ingredients in the plating bath but should be any amount which is effective to improve the brightness, ductility and malleability of the zinc deposit obtained from the baths. Generally up to about 15 grams of the salt may be used per liter of plating bath.

The zinc plating baths of the invention also may contain at least one nonionic, cationic or amphoteric ethylene oxide condensate surfactant. In addition to the ethoxylated naphthols described earlier, these surfactants may be selected from the group consisting of ethoxylated alkyl phenols, ethoxylated fatty alcohols, ethoxylated fatty acids, ethoxylated fatty acid amides, ethoxylated fatty amines, polyethylene oxide condensates, block copolymers of ethylene oxide and propylene oxide based on propylene glycol or ethylene glycol, and sulfonated ethoxylated aliphatic amine. Generally, the surfactants will contain up to about 40 or more ethylene oxide units. The amount of nonionic, cationic or amphoteric ethylene oxide condensate included in the baths of the invention may vary over a wide range although it is preferred to include from about 0.5 to about 10 g/l of the condensate in the bath.

The ethoxylated alkyl phenols may be represented by the formula

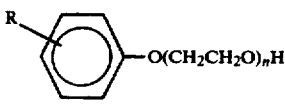  (VIII)

wherein R is an alkyl group containing up to about 20 carbon atoms and n is an integer from about 10 to about 30. Preferably the alkyl group contains from about 6 to 20 carbon atoms. Examples of such alkyl groups include octyl, isooctyl, nonyl, dodecyl, octadecyl. Ethoxylated alkyl phenols are available commercially under a variety of trademarks such as "Surfonic" from Jefferson Chemical Co., "Renex" from Atlas Chemical Industries, Inc., and "Igepal" from GAF Corporation Chemical Products.

Polyethylene oxide or polyethylene glycol condensates having different molecular weights have been found to give good results. Condensates of this type which may be represented by the general formula $$HO(CH_2CH_2O)_nH \quad (IX)$$

wherein n is an integer from about 5 to about 100 or more are known in the art and are commercially available such as for example under the general trade designation Carbowax from Union Carbide. Specific examples include Carbowax No. 1000 which has a molecular weight range of from about 950 to 1050 and contains from 20 to 24 ethoxy units per molecule. Carbowax No. 4000 has a molecular weight range of from about 3000 to 3700 and contains from 68 to 85 ethoxy units per molecule.

Ethoxylated aliphatic alcohols are useful as surfactants in the plating baths of the invention and may be characterized by the formula $$RO(CH_2CH_2O)_n—H \quad (X)$$

wherein R is an alkyl group containing from about 8 to 24 carbon atoms and n is an integer of from 5 to about 30. Fatty alcohols such as oleyl and stearyl are preferred examples. A number of ethoxylated aliphatic alcohols are available commercially such as from Emery Industries under the general trademark "Trycol". A specific example is "Trycol OAL-23" which is an ethoxylated oleyl alcohol.

The surfactant also may be an ethoxylated fatty acid represented by the formula $$RC(O)—O(CH_2CH_2O)_nH \quad (XI)$$

or an ethoxylated fatty acid amide represented by the formula $$RC(O)—N(H)(CH_2CH_2O)_nH \quad (XII)$$

wherein R is an alkyl carbon chain containing from about 8 to 24 carbon atoms and n is an integer from about 5 to about 20.

The ethoxylated fatty acid can be obtained by reacting ethylene oxide with a fatty acid such as oleic acid, stearic acid, palmitic acid, etc. The ethoxylated fatty acids are available commercially such as from Armak Industries, Chemical Division under the trademark "Ethofat". Specific examples are: Ethofat C/15, coco acid ethoxylated with 5 moles of ethylene oxide, and Ethofats O/15 and O/20, which are oleic acid reacted with 5 and 10 moles of ethylene oxide respectively. The ethoxylated fatty acid amides can be obtained by reacting ethylene oxide with a fatty acid amide such as oleamide, stearamide, coconut fatty acid amides and lauric amide. The ethoxylated fatty acid amides, which may also be identified as ethoxylated alkylolamides are commercially available from, for example, The Stepan Chemical Company under the general trade designation Amidox, and from Armak under the trademark ETHOMID.

Another type of nonionic ethoxylated surfactant which is useful in the plating baths of the invention are block copolymers of ethylene oxide and propylene oxide based on a glycol such as ethylene glycol or propylene glycol. The copolymers based on ethylene glycol generally are prepared by forming a hydrophilic base by reaction of ethylene oxide with ethylene glycol followed by condensation of this intermediate product with propylene oxide. The copolymers based on propylene glycol similarly are prepared by reacting propylene oxide with propylene glycol to form the intermediate compound which is then condensed with ethylene oxide. By varying the proportions of ethylene oxide and propylene oxide used to form the above copolymers, the properties may be varied. Both of the above types of copolymers are available commercially such as from BASF Wyandotte under the general trademark PLURONIC. The condensates based on ethylene glycol are identified as the "R" series, and these compounds preferably contain from about 30 to about 80% of polyoxyethylene in the molecule and may be either liquids or solids. The condensates based on propylene glycol are identified generally by BASF Wyandotte as the "F", "L", or "P" series and these may contain from about 5 to about 80% of ethylene oxide. The "L" series of propylene glycol based copolymers are liquids, the "F" series are solids and the "P" series are pastes. The solids and pastes can be used when they are soluble in the bath formulation. The molecular weights of these block copolymers range from about 400 to about 14000.

The ethylene oxide condensate included in the plating baths of surfactants are the ethoxylated amines and particularly the ethoxylated fatty amines which can be prepared by condensing ethylene oxide with fatty acid amines by techniques known to those in the art. The alkoxylated amines which may be utilized in the plating baths of the invention may be represented by the following formulas

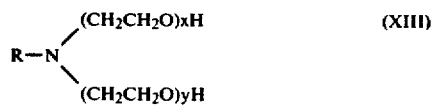  (XIII)

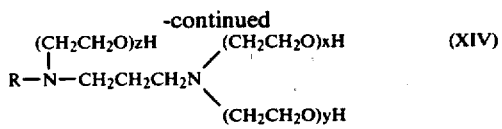

(XIV)

wherein R is a fatty amine alkyl group containing from 8 to 22 and preferably 12 to 18 carbon atoms, and x, y and z are each independently integers from 1 to about 30, and the sum of x, y and z is an integer of from 3 to about 50.

The above described alkoxylated amines are known in the art and are available from a variety of commercial sources. The amines of the type represented by formula XIII can be prepared by condensing various amounts of ethylene oxide with primary fatty amines which may be a single amine or a mixture of amines such as are obtained by the hydrolysis of tallow oils, sperm oils, coconut oils, etc. Specific examples of fatty amines containing from 8 to 22 carbon atoms include saturated as well as unsaturated aliphatic amines such as octyl amine, decyl amine, lauryl amine, stearyl amine, oleyl amine, myristyl amine, palmityl amine dodecyl amine, and octadecyl amine.

The above described amines can be prepared, as mentioned above, by condensing alkylene oxides with the above-described primary amines by techniques known to those in the art. A number of such alkoxylated amines is commercially available from a variety of sources. The alkoxylated amines of the type represented by formula XIII are available from the Armak Chemical Division of Akzona, Inc., Chicago, Illinois, under the general trade designation "Ethomeen". Specific examples of such products include "Ethomeen C/15" which is an ethylene oxide condensate of a coconut fatty amine containing about 5 moles of ethylene oxide; "Ethomeen C/20" and "C/25" which also are ethylene oxide condensation products from coconut fatty amine containing about 10 and 15 moles of ethylene oxide respectively; "Ethomeen S/15" and "S/20" which are ethylene oxide condensation products with stearyl amine containing about 5 and 10 moles of ethylene oxide per mole of amine respectively; and "Ethomeen T/15" and "T/25" which are ethylene oxide condensation products of tallow amine containing about 5 and 15 moles of ethylene oxide per mole of amine respectively. Commercially available examples of alkoxylated amines of the type represented by formula XIV include "Ethoduomeen T/13" and "T/20" which are ethylene oxide condensation products of N-tallow trimethylene diamine containing about 3 and 10 moles of ethylene oxide per mole of diamine respectively.

The ethylene oxide condensate included in the plating baths of the invention also can be amphoteric. The preferred examples of amphoteric condensates are sulfonated ethoxylated aliphatic amines such as sulfonated ethoxylated fatty amines and condensates represented by the formula

wherein $R_1$, $R_2$ and $R_3$ are each independently straight or branched chain alkyl groups, preferably containing about 8 to 18 carbon atoms, n is an integer of from about 5 to about 20, and X is a bath-compatible cation such as sodium, potassium, ammonium, magnesium, tin, lead, calcium, etc. Such amphoteric condensates are known in the art. Examples of commercially available amphoteric condensates useful in the plating baths of the invention include the sulfated fatty polyoxyethylene quaternary nitrogen compound available from GAF Corporation under the trade designation "Antaron PC-37", and a condensate of the type represented by Formula XV available from Rohm and Haas Co. under the trade designation "Triton QS-15" wherein $R_1$, $R_2$ and $R_3$ are each about 12 to 14 carbon atoms, n is about 15, and X is sodium.

Examples of typical acidic zinc plating baths to which the brightener compositions of the invention may be added are as follows:

| Bath No. 1 | |
|---|---|
| Zinc chloride | 105 g/l |
| Potassium chloride | 210 g/l |
| Boric acid | 20 g/l |
| pH | 5 |
| Bath No. 2 | |
| Zinc chloride | 30 g/l |
| Ammonium chloride | 150 g/l |
| pH | 5 |

The acid zinc plating baths of the present invention deposit a level and bright zinc deposit on substrates at any conventional temperature such as from about 25° to about 60° C. Still plating baths generally will be operated at a lower range of the temperature such as from about 25° to about 40° C. whereas high-speed plating baths for strip or wire plating may be operated over the entire range of from about 25° to about 60° C.

The following examples illustrate the aqueous acidic zinc plating baths of the invention.

| | g/l |
|---|---|
| Example A | |
| Bath No. 1 to which is added: | |
| CRU-PEG HS 1000 | 6 |
| Sodium xylene monosulfonate ("Ultrawet 40 SX") | 12 |
| Ethoxylated beta-naphthol (12 moles EtO) | 0.6 |
| Blancol N (sodium salt of a sulfonated naphthalene condensate from GAF Corp.) | 0.6 |
| Sodium benzoate | 2.6 |
| Benzylidene acetone | 0.1 |
| Example 2 | |
| CRU-PEG HS 1000 | 6 |
| "Ultrawet 40 SX" | 8 |
| Ethoxylated beta-naphthol (12 moles EtO) | 0.6 |
| Blancol N | 0.6 |
| Sodium benzoate | 2.6 |
| Benzylidene acetone | 0.1 |
| Example 3 | |
| CRU-PEG HS 2000 | 6 |
| "Ultrawet 40 SX | 4.5 |
| Ethoxylated beta-naphthol (12 moles EtO) | 0.6 |
| Blancol N | 0.6 |
| Sodium benzoate | 2.6 |
| Benzylidene acetone | 0.1 |
| Example 4 | |
| CRU-PEG HS 1000 | 6 |
| Ultrawet 40 SX | 12 |
| Blancol N | 0.6 |
| Sodium benzoate | 2.6 |

| -continued | g/l |
|---|---|
| Benzylidene acetone | 0.1 |

The utility of the plating baths of the invention is demonstrated by plating steel Hull Cell panels in a 267 ml. Hull Cell. Current densities are measured with a Hull Cell scale. The plating baths of the above examples produce a bright level zinc deposit over a wide current density range.

In practice, the improved aqueous zinc plating baths of the invention may be operated on a continuous or intermittent basis, and from time to time, the components of the bath have to be replenished. The various components may be added singularly as required or may be added in combination. The amounts of the various additive compositions to be added to the plating baths may be varied over a wide range depending on the nature and performance of the zinc plating bath to which the composition is added. Such amounts can be determined readily by one skilled in the art.

The following examples illustrate additive compositions or concentrates which may be prepared and utilized in accordance with the invention for preparing or maintaining the baths of the invention and/or improving the performance of the baths by the invention.

| | Parts by Weight |
|---|---|
| Additive Composition 1 | |
| CRU-PEG HS 1000 | 30 |
| Sodium xylene sulfonate | 20 |
| Sodium benzoate | 10 |
| Water | 40 |
| Additive Composition 2 | |
| CRU-PEG HS 2000 | 30 |
| Sodium xylene sulfonate | 20 |
| Beta-naphthol reacted with 12 moles of ethylene oxide | 15 |
| Benzylidene acetone | 5 |
| MeOH | 30 |
| Additive Composition 3 | |
| CRU-PEG HS 1000 | 25 |
| Benzylidene acetone | 5 |
| Sodium benzoate | 10 |
| MeOH | 30 |

The embodiments of the invention in which an exclusive property or privilege is claimed are defined as follows:

1. An aqueous acidic plating bath substantially free of ammonium ions for the electrodeposition of a zinc coating on a substrate which comprises zinc ions, and an amount, sufficient to provide a level and bright zinc electrodeposit, of a polymeric sulfur-containing compound having the general formula

$$RS(R'O)_nH, \text{ or} \qquad (I)$$

$$S[(R'O)_nH]_2 \qquad (II)$$

wherein R is an alkyl group containing up to about 24 carbon atoms, each R' independently is an alkylene group or mixture of alkylene groups containing 2 or 3 carbon atoms and each n is independently an integer of from 1 to about 100.

2. The aqueous plating bath of claim 1 wherein the polymeric sulfur-containing compound is prepared by reacting one mole of hydrogen sulfide or 2-hydroxyethyl sulfide with up to about 100 moles of ethylene or propylene oxide.

3. The plating bath of claim 1 wherein the bath also contains chloride ions and boric acid.

4. The plating bath of claim 1 wherein the bath also contains at least one aromatic carbonyl-containing compound.

5. The plating bath of claim 4 wherein the aromatic carbonyl-containing compound is an aromatic aldehyde, ketone or carboxylic acid or bath-soluble salt of carboxylic acid.

6. The plating bath of claim 4 wherein the aromatic carbonyl compound comprises a mixture of a bath-soluble salt of benzoic acid and an aromatic ketone.

7. The plating bath of claim 1 wherein the bath also contains at least one aromatic sulfonic acid or salt thereof having the general formula

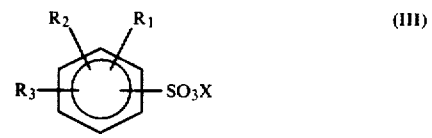

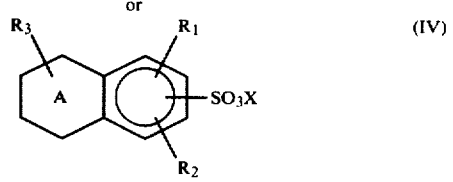

wherein
$R_1$, $R_2$ and $R_3$ are each independently hydrogen or lower alkyl groups,
X is hydrogen, ammonium or any metal with the proviso that the metal sulfonate is soluble in the plating bath and A is a saturated, unsaturated or aromatic ring.

8. The plating bath of claim 7 wherein the alkyl groups are straight or branched chain alkyl groups containing up to about 6 carbon atoms.

9. The plating bath of claim 1 wherein the bath also contains at least one polyoxyalkylated naphthol.

10. The plating bath of claim 9 wherein the polyoxyalkylated naphthol has the formula

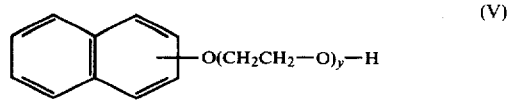

wherein y is from about 6 to about 40.

11. The plating bath of claim 10 wherein the polyoxyalkylated naphthol is derived from a beta-naphthol.

12. The plating bath of claim 1 wherein the bath also contains at least one anionic aromatic sulfonic acid condensate or salt thereof.

13. The plating bath of claim 12 wherein the sulfonic acid condensate is obtained by the polycondensation of formaldehyde and an aromatic sulfonic acid.

14. The plating bath of claim 1 wherein the bath also contains at least one nonionic, cationic, or amphoteric ethylene oxide condensate surfactant.

15. The plating bath of claim 14 wherein the surfactant is selected from the group consisting of ethoxylated alkyl phenols, ethoxylated fatty alcohols, ethoxylated fatty acids, ethoxylated fatty acid amides, ethoxylated fatty amines, polyethylene oxide condensates, block copolymers of ethylene oxide and propylene oxide based on propylene glycol or ethylene glycol and sulfonated ethoxylated aliphatic amines.

16. A method of electrodepositing a bright zinc coating on a substrate which comprises electroplating said substrate in an aqueous acidic zinc bath according to any one of claims 1, 2 or 3–15.

* * * * *